(12) United States Patent
Uhrich et al.

(10) Patent No.: US 11,674,429 B1
(45) Date of Patent: Jun. 13, 2023

(54) METHOD AND SYSTEM FOR CONTROLLING SCR TEMPERATURE

(71) Applicant: Ford Global Technologies, LLC, Dearborn, MI (US)

(72) Inventors: Michael Uhrich, Wixom, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/646,558

(22) Filed: Dec. 30, 2021

(51) Int. Cl.
| F01N 11/00 | (2006.01) |
| F01N 3/20 | (2006.01) |
| F01N 3/28 | (2006.01) |
| F01N 13/08 | (2010.01) |

(52) U.S. Cl.
CPC ............ *F01N 11/007* (2013.01); *F01N 3/208* (2013.01); *F01N 3/2066* (2013.01); *F01N 3/2892* (2013.01); *F01N 11/005* (2013.01); *F01N 13/087* (2013.01); *F01N 2240/36* (2013.01); *F01N 2260/02* (2013.01); *F01N 2260/18* (2013.01); *F01N 2410/02* (2013.01); *F01N 2410/03* (2013.01); *F01N 2430/06* (2013.01); *F01N 2550/02* (2013.01); *F01N 2550/06* (2013.01); *F01N 2550/10* (2013.01); *F01N 2560/025* (2013.01); *F01N 2610/02* (2013.01); *F01N 2610/102* (2013.01); *F01N 2900/04* (2013.01); *F01N 2900/14* (2013.01); *F01N 2900/1404* (2013.01); *F01N 2900/1602* (2013.01); *F01N 2900/18* (2013.01)

(58) Field of Classification Search
CPC combination set(s) only.
See application file for complete search history.

(56) References Cited

U.S. PATENT DOCUMENTS

| 5,388,406 A | * | 2/1995 | Takeshima | .......... F01N 13/0097 60/288 |
| 6,003,309 A | * | 12/1999 | Agustin | ................ F01N 3/2053 60/276 |
| 8,506,893 B2 | | 8/2013 | Gandhi et al. | |
| 8,776,498 B2 | | 7/2014 | Gandhi et al. | |
| 9,376,949 B2 | | 6/2016 | Gandhi et al. | |
| 9,689,297 B2 | | 6/2017 | Qi | |
| 10,294,839 B2 | | 5/2019 | Bailey | |
| 2002/0121084 A1 | * | 9/2002 | Deeba | .................... F01N 3/0885 60/288 |
| 2003/0192306 A1 | * | 10/2003 | Nakatani | ................ F01N 3/2053 60/288 |
| 2005/0013756 A1 | * | 1/2005 | Amou | ................ B01D 53/9495 422/177 |

(Continued)

FOREIGN PATENT DOCUMENTS

JP    H07224642 A   *   8/1995    ............. Y02A 50/20

*Primary Examiner* — Binh Q Tran
(74) *Attorney, Agent, or Firm* — Vincent Mastrogiacomo; McCoy Russell LLP

(57) ABSTRACT

Methods and systems to control a temperature of a selective catalytic reduction catalyst are disclosed. In one example, a diverter valve that includes two butterfly valves that are coupled together via a shaft is adjusted to control a temperature at an inlet of the selective catalytic reduction catalyst so that the selective catalytic reduction catalyst may operate efficiently.

19 Claims, 6 Drawing Sheets

(56) References Cited

U.S. PATENT DOCUMENTS

| | | | |
|---|---|---|---|
| 2007/0272480 A1* | 11/2007 | Kuroda | F01N 13/0093 181/254 |
| 2012/0090295 A1* | 4/2012 | Yacoub | F01N 3/2066 60/303 |
| 2014/0144125 A1* | 5/2014 | Cavataio | F02D 41/1456 60/285 |

* cited by examiner

METHOD AND SYSTEM FOR CONTROLLING SCR TEMPERATURE

FIELD

The present application relates to methods and systems for controlling selective catalytic reduction (SCR) temperature within an emissions system of an internal combustion engine.

BACKGROUND/SUMMARY

An internal combustion engine may generate CO, HC, and NOx as bi-products of combustion. These exhaust gas constituents may be processed via a three-way catalyst into $H_2O$, $N_2$, and $CO_2$. However, to achieve more stringent tailpipe emissions regulations, a SCR catalyst may be needed. A SCR catalyst may convert NOx into $N_2$ and $H_2O$ when the SCR catalyst is within a specified temperature range. If the SCR catalyst temperature is above a first threshold temperature, the SCR catalyst may release $NH_3$ or it may oxidize $NH_3$ to NOx. If the SCR catalyst temperature is below a second threshold temperature, the SCR may operate at a lower efficiency. In addition, if the SCR catalyst does not contain $NH_3$, the SCR catalyst may be unable to convert NOx to $N_2$ and $H_2O$. Therefore, it may be desirable to operate the SCR catalyst with a predetermined temperature range.

The inventors herein have recognized the challenges that may be associated with operating an SCR catalyst and have developed a method for operating a selective catalytic reduction (SCR) catalyst, comprising: controlling a temperature at an inlet of the SCR via mixing exhaust gas flowing through a first exhaust passage and exhaust gas flowing through a second exhaust passage, the second exhaust passage including cooling fins, the first exhaust passage not including cooling fins.

By mixing cooled exhaust gases with exhaust gases that have not been cooled via a cooling passage, it may be possible to provide the technical result of achieving a requested temperature at an inlet of a SCR catalyst. Operating the SCR catalyst in the desired or requested temperature range may reduce emissions from a vehicle. In addition, temperature of the SCR catalyst may be controlled to improve SCR diagnostics.

The present approach may provide several advantages. Specifically, the approach may improve operation of an SCR catalyst. Further, the approach may reduce a possibility of SCR catalyst degradation. In addition, the approach may be applied to improve diagnostics for a SCR catalyst.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
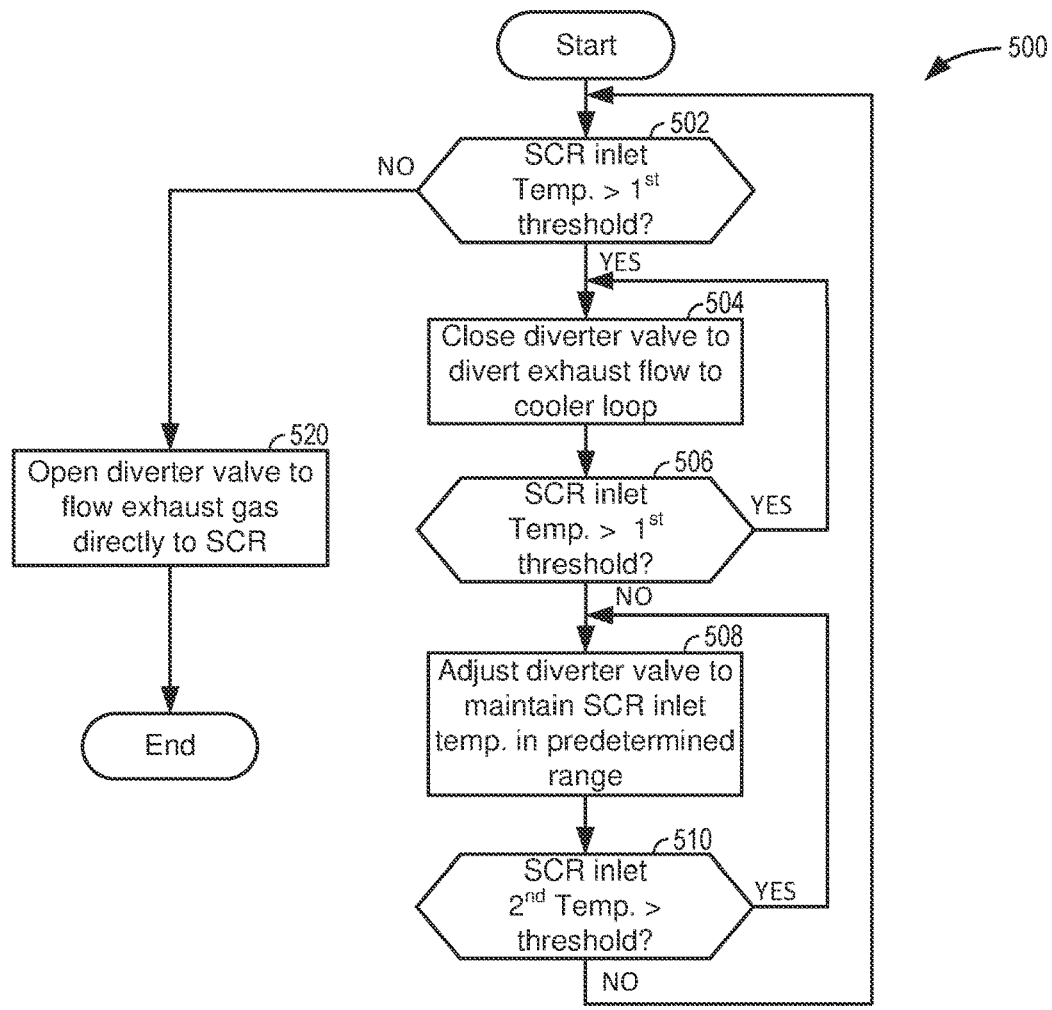
FIGS. 5 and 6 show flowcharts for controlling temperature of a SCR catalyst and diagnosing the SCR catalyst.
Figure 6:
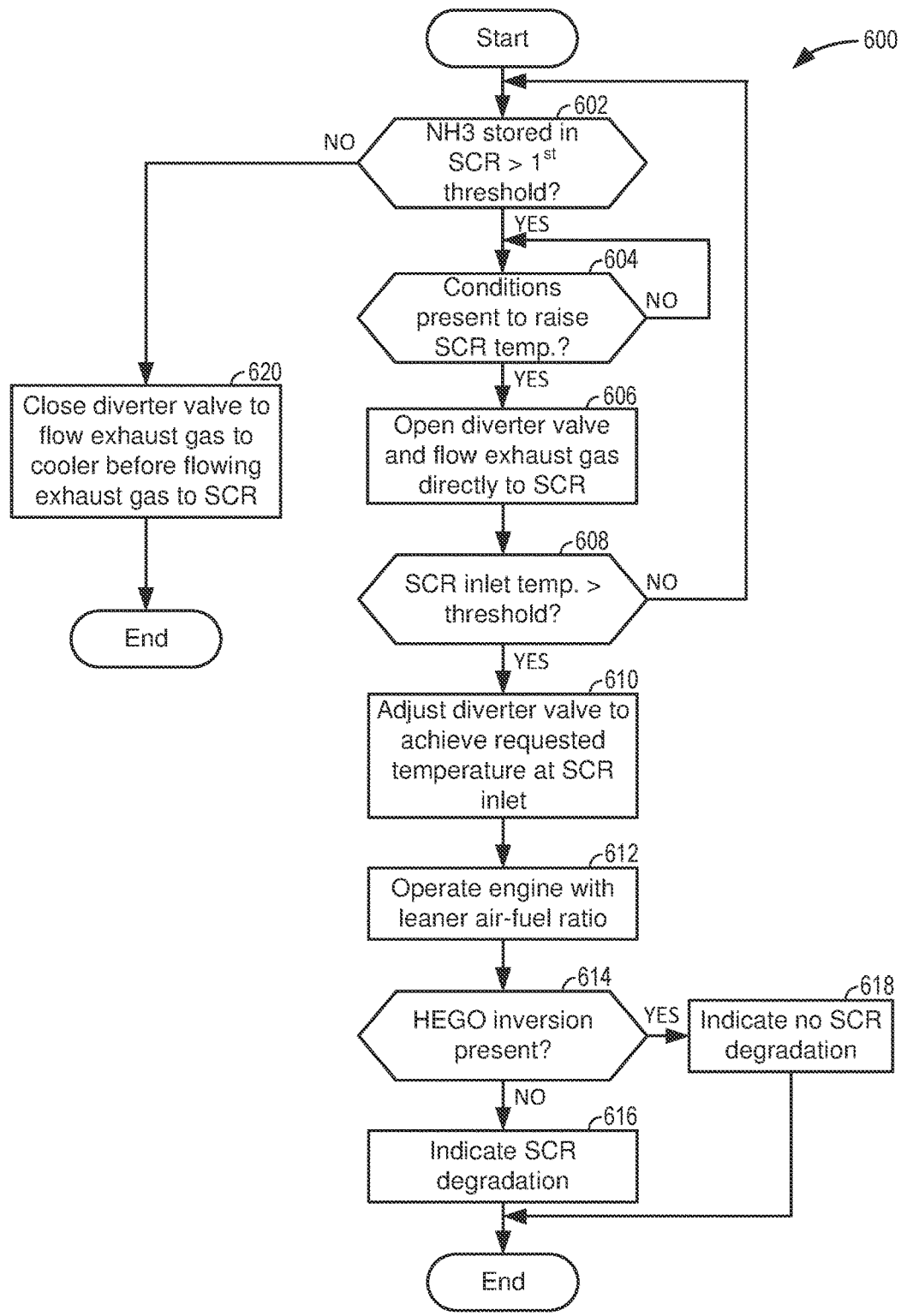

The following description relates to systems and methods for controlling a temperature of an SCR catalyst and diagnosing the SCR catalyst. In one example, two parallel exhaust passages are provided and exhaust gases may be mixed from the two parallel passages to provide a requested temperature at an inlet of a SCR catalyst. The SCR catalyst may be included in a vehicle of the type shown in FIG. 1. The temperature of a SCR catalyst may be controlled via the exhaust systems shown in FIGS. 2 and 3. An example operating sequence for diagnosing a SCR catalyst is shown. FIGS. 5 and 6 show example methods for controlling a temperature of a SCR catalyst and diagnosing the SCR catalyst.

Figure 1:
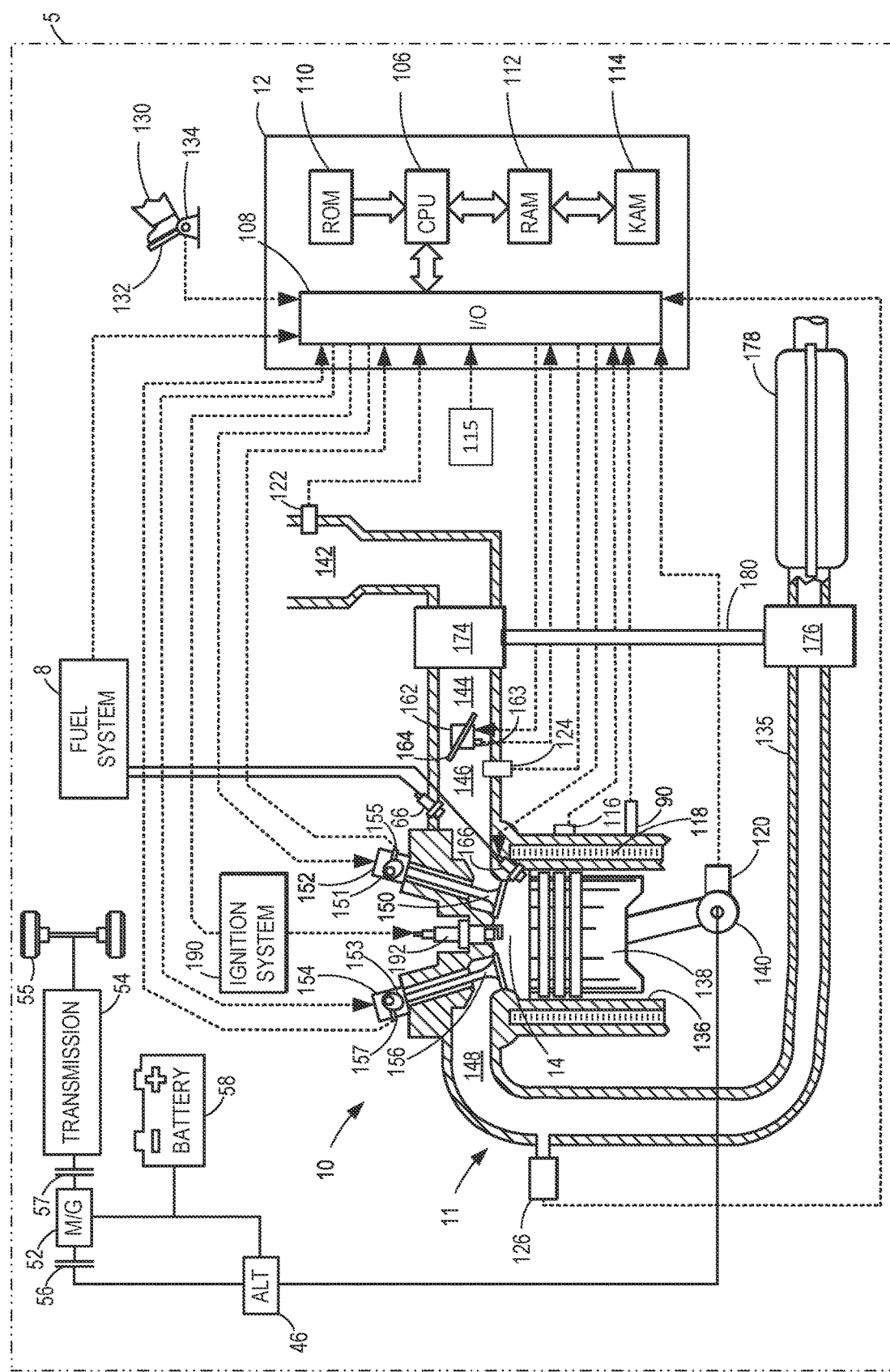
FIG. 1 shows a schematic depiction of an engine system of a vehicle.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via a driver demand pedal 132. In this example, driver demand pedal 132 includes a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

Engine 10 may be rotated via electric machine 52 during starting or when engine 10 is operated as an air pump. Alternatively, a starter motor (not shown) may rotate engine 10 during starting or when engine 10 is operated as an air pump. The starter motor may engage crankshaft 140 via a flywheel (not shown).

The powertrain may be configured in various manners, including as a parallel, a series, or a series-parallel hybrid vehicle. Further, engine 10 and electric machine 52 may be coupled via a gear set instead of a clutch in some configurations. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 may be a three-way catalyst or an oxidation catalyst. Exhaust manifold 148, emissions control device 178, exhaust gas sensor 126, and temperature sensors may be included in engine exhaust system 11.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 22:1, depending on whether engine 10 is configured as a gasoline or diesel engine. The compression ratio may also be increased if direct injection is used due to its effect on engine knock.

Each cylinder of engine 10 may include a spark plug 192 for initiating combustion when the engine is configured to combust gasoline or petrol. However, spark plug 192 may be omitted when engine 10 is configured to combust diesel fuel. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition or compression ignition), one or multiple injections of fuel may be performed per cycle via either or both injectors. The multiple DI injections may be performed during the compression stroke, intake stroke, or any appropriate combination thereof in what is referred to as split fuel injection.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations via sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders. In addition, controller 12 may receive input from and provide data to human/machine interface 115. In one example, human/machine interface 115 may be a touch screen device, a display and keyboard, a phone, or other known device.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more entire engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Figure 2:
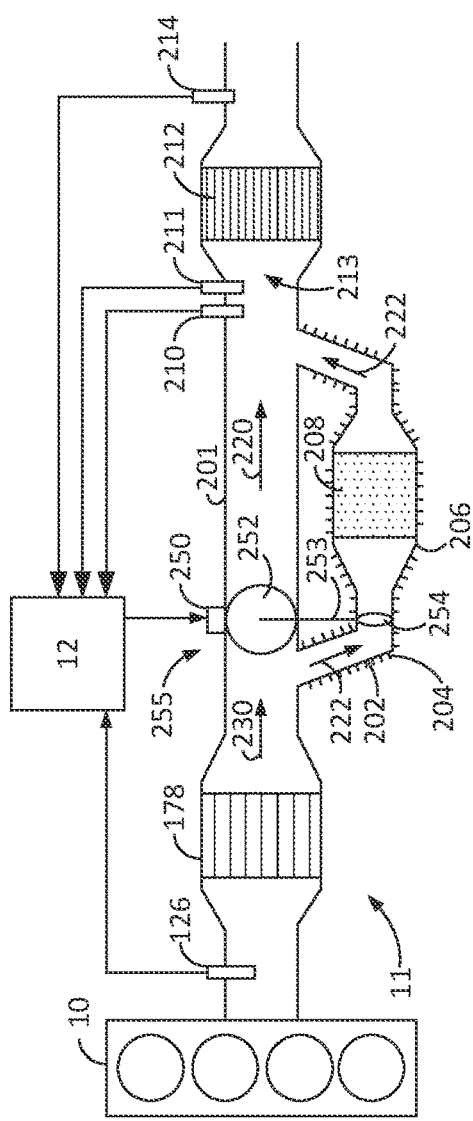
FIGS. 2 and 3 show examples of exhaust systems controlling temperature of a SCR catalyst.

Referring now to FIG. 2, a detailed view of an exhaust system 11 that includes a SCR catalyst 212 is shown. The exhaust system 11 of FIG. 2 may be incorporated into the vehicle 5 shown in FIG. 1. The exhaust system 11 of FIG. 2 may be operated according to the methods of FIGS. 5 and 6.

Exhaust system 11 may include an oxygen sensor 126 that is placed upstream of a three-way catalyst 178 according to the direction of exhaust flow 230. Exhaust gases may travel through a first passage 201 in direction 220 when butterfly valve 252 is in an open position. Exhaust gases may travel through a second passage 202 in direction 222 when butterfly valve 254 is in an open position. First passage 201 and second passage 202 may be configured in parallel. Butterfly valve 252 is coupled to butterfly valve 254 via shaft 253. Butterfly valve 252 may be fully open when butterfly valve 254 is fully closed. Butterfly valve 252 may be fully closed when butterfly valve 254 is fully open. Electric actuator (e.g., an electric motor) 250 may adjust a position of butterfly valve 252 and a position of butterfly valve 254 simultaneously.

First passage 201 allows exhaust gases to pass from engine 10 to SCR catalyst 212 with minimal cooling. Exhaust gases may cool significantly when they flow through second passage 202. Second passage 202 includes cooling fins 204 to remove heat from exhaust gases and first passage 201 does not include cooling fins. Second passage 202 may also include an uncoated catalyst substrate 208 (e.g., a metal or ceramic substrate component) to increase the thermal inertia of the system. The uncoated substrate 208 may be located in catalyst can 206. The catalyst can 206 may also include fins 204 for extracting heat from the substrate 208, thereby cooling exhaust gases that flow through the second passage 202. When butterfly valve 252 and butterfly valve 254 are partially open, exhaust gases may mix at inlet 213 of SCR catalyst 212. Temperature at inlet 213 may be determined from output of temperature sensor 210. Oxygen concentration may be determined at inlet 213 via oxygen sensor 211. Oxygen concentration downstream of SCR catalyst 212 may be determined via oxygen sensor 214. Controller 12 may process signals from sensors 126, 210, 211, and 214 to adjust a position of diverter valve 255, which includes butterfly valve 252 and butterfly valve 254.

Figure 3:
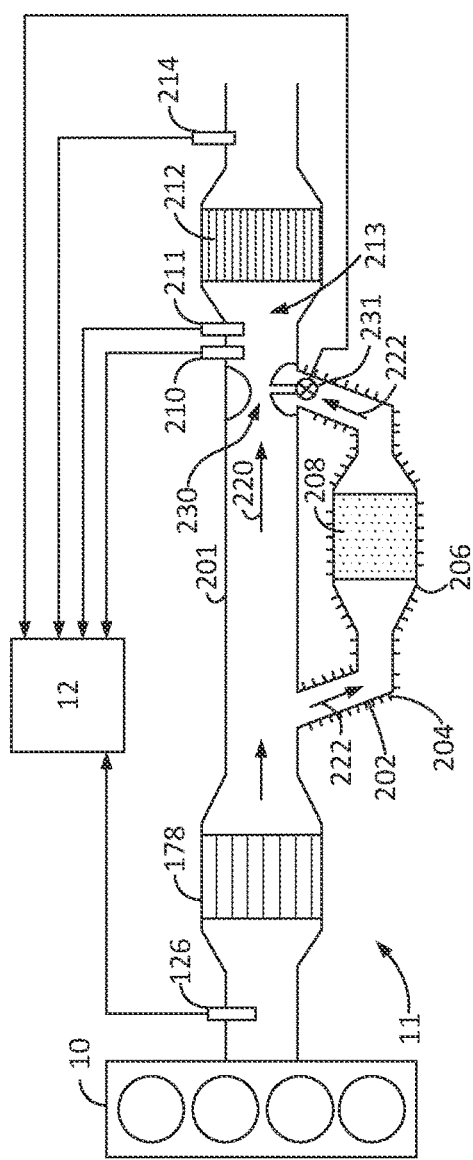

Referring now to FIG. 3, a detailed view of a second exhaust system 11 that includes a SCR catalyst 212 is shown. The second exhaust system 11 of FIG. 3 may be incorporated into the vehicle 5 shown in FIG. 1. The second exhaust system 11 of FIG. 3 may be operated according to the methods of FIGS. 5 and 6. The second exhaust system 11 of FIG. 3 includes many of the components of the first exhaust system 11 shown in FIG. 2, therefore for the sake of brevity components that are indicated by like numerals are the same component and they will not be described again. For example, three-way catalyst 178 shown in FIG. 2 is the same as three-way catalyst 178 shown in FIG. 3. New components will be given new numerical identifiers and they will be described.

Exhaust system 11 includes a venturi 230, which may be applied to mix exhaust gases flowing through first passage 201 and second passage 202. The amount of cooled exhaust that may be mixed with exhaust gases that flow through first passage 201 may be adjusted or controlled via adjusting a position of valve 231. Thus, a temperature at inlet 213 of SCR catalyst 212 may be controlled via adjusting a position of valve 231. In some examples, valve 231 may be omitted and cool exhaust may flow to inlet according to an opening in venturi 230.

Thus, the system of FIGS. 1-3 provides for a system for controlling engine emissions, comprising: an internal combustion engine including an exhaust system; a selective catalytic reduction catalyst included in the exhaust system; and a controller including executable instructions stored in non-transitory memory that cause exhaust gases from the internal combustion engine to flow into at least one of two passages in the exhaust system, the two passages arranged in parallel, one of the two passages including cooling fins and an uncoated catalyst substrate, the other of the two passages not including cooling fins. The system further comprises a venturi, the venturi configured to mix exhaust gases from the one of the two passages and the other of the two passages. The system further comprises additional instructions to adjust exhaust gas flow through the one of the two passages via a valve. The system further comprises a diverter valve, the diverter valve including two butterfly valves. The system includes where the two butterfly valves are coupled via a shaft. The system further comprises additional instructions to adjust a position of a valve in response to a temperature at an inlet of the selective catalytic reduction catalyst. The system includes where the valve closes the other of the two passages and opens the one of the two passages in response to a temperature at an inlet of the selective catalytic reduction catalyst exceeding a threshold temperature. The system includes where the valve opens the other of the two passages and closes the one of the two passages in response to the temperature at the inlet of the selective catalytic reduction catalyst being less than a second threshold temperature.

Figure 4:
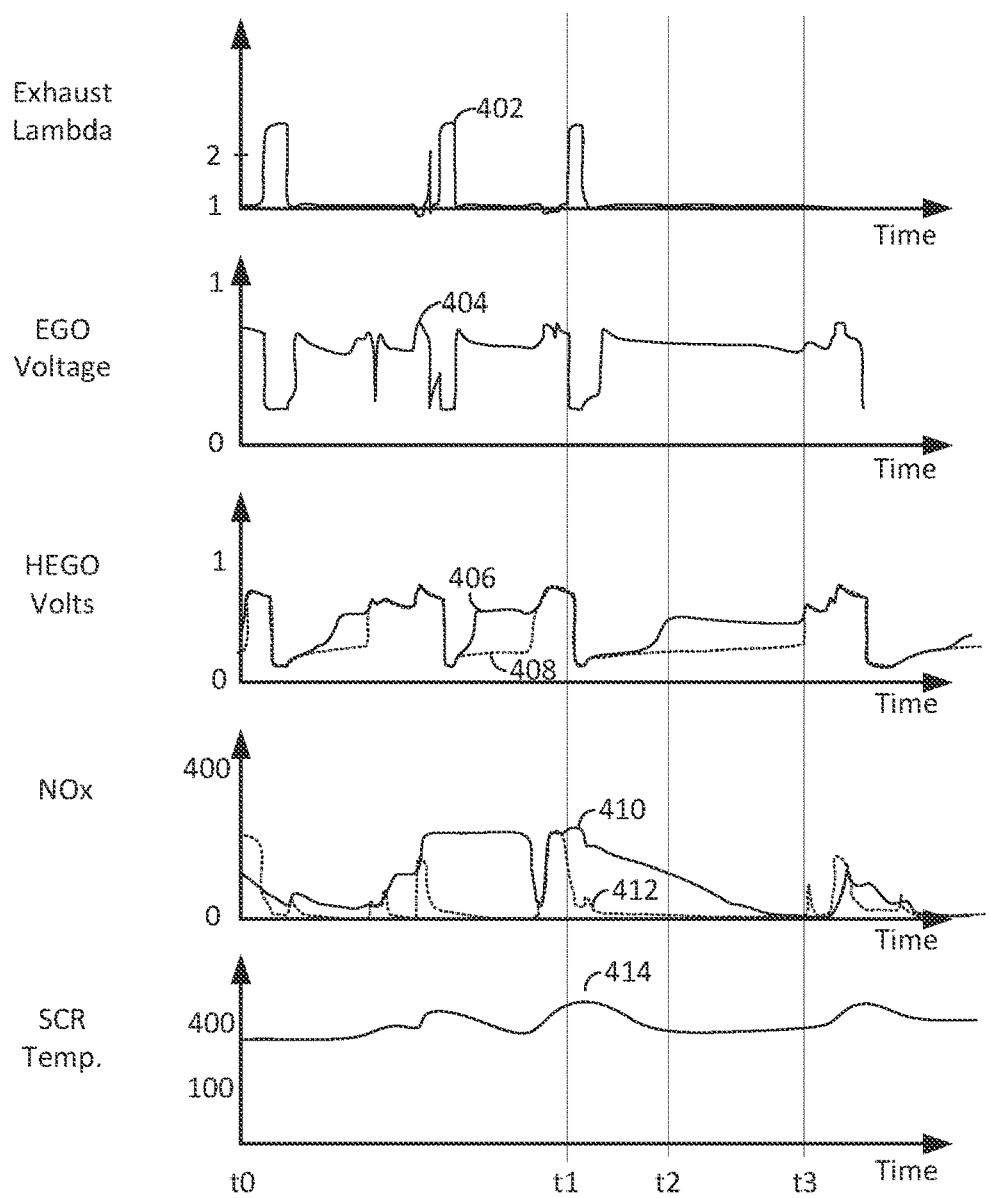
FIG. 4 shows an operating sequence for diagnosing a SCR catalyst.

Referring now to FIG. 4, an example prophetic diagnostic sequence for a SCR catalyst is shown. The sequence of FIG. 4 may be provided by the system of FIGS. 1-3 in cooperation with the method of FIGS. 5 and 6. The vertical lines at times t0-t3 represent times of interest in the sequence.

The first plot from the top of FIG. 4 is a plot of engine exhaust gas Lambda (e.g., engine air-fuel ratio divided by the stoichiometric engine air-fuel ratio) versus time. The vertical axis represents the engine exhaust gas Lambda and the exhaust gas Lambda increases in the direction of vertical axis arrow. The horizontal axis represents time and time increases from the left side of the plot to the right side of the plot. Trace 402 represents the engine exhaust gas Lambda value.

The second plot from the top of FIG. 4 is a plot of output of an exhaust gas oxygen sensor that is positioned upstream of a three-way catalyst versus time. The vertical axis represents the exhaust gas oxygen sensor output and the exhaust gas oxygen sensor output indicates lean conditions when trace 404 is closer to the horizontal axis. The exhaust gas oxygen sensor output indicates rich conditions when trace 404 is closer to the vertical axis arrow. The horizontal axis represents time and time increases from the left side of the plot to the right side of the plot. Trace 404 represents the exhaust gas oxygen sensor output voltage.

The third plot from the top of FIG. 4 is a plot of output of heated exhaust gas oxygen sensor voltage versus time. The vertical axis represents the heated exhaust gas oxygen sensor output voltage and the exhaust gas oxygen sensor output indicates lean conditions when the traces 406 and/or 408 are closer to the horizontal axis. The heated exhaust gas oxygen sensor output indicates rich conditions when traces 406 and/or 407 are closer to the vertical axis arrow. The horizontal axis represents time and time increases from the left side of the plot to the right side of the plot. Trace 406 represents the heated exhaust gas oxygen sensor output voltage for a sensor that is positioned in the exhaust system downstream of the SCR catalyst. Trace 408 represents the heated exhaust gas oxygen sensor output voltage for a sensor that is positioned in the exhaust system upstream of the SCR catalyst.

The fourth plot from the top of FIG. 4 is a plot of output of NOx sensor output versus time. The vertical axis represents the NOx sensor output and the NOx sensor output increases in the direction of the vertical axis arrow. The horizontal axis represents time and time increases from the left side of the plot to the right side of the plot. Trace 410 represents output of a NOx sensor that is positioned in the exhaust system downstream of the SCR catalyst. Trace 412 represents output of a NOx sensor that is positioned in the exhaust system upstream of the SCR catalyst.

The fifth plot from the top of FIG. 4 is a plot of SCR temperature versus time. The vertical axis represents the SCR temperature. The horizontal axis represents time and time increases from the left side of the plot to the right side of the plot. Trace 414 represents the SCR temperature.

At time t0, the exhaust Lambda value is near one and the voltage of the exhaust gas oxygen (EGO) sensor that is positioned upstream of the three-way catalyst indicates rich (e.g., a voltage that is greater than 0.45 volts). The exhaust gas oxygen sensors that are positioned upstream and downstream of the SCR catalyst indicate rich and the NOx sensor outputs are indicating that NOx in the exhaust system is declining. The SCR temperature is greater than 300° Celsius.

At time t1, the exhaust Lambda changes from rich to lean and the exhaust gas oxygen sensor that is positioned upstream of the three-way catalyst switches to lean. Shortly thereafter, the exhaust gas oxygen sensors that are positioned upstream and downstream of the SCR catalyst indicate lean and the NOx sensor outputs are indicating that $NH_3$ is being released from the SCR catalyst while the SCR catalyst temperature is near 550° Celsius.

Between time t1 and time t2, the exhaust Lambda changes from lean to rich and the exhaust gas oxygen sensor that is positioned upstream of the three-way catalyst switches to rich. The exhaust gas oxygen sensors that are positioned upstream and downstream of the SCR catalyst indicate lean and the NOx sensor outputs continue indicating that $NH_3$ is being released from the SCR catalyst.

At time t2, the exhaust Lambda continues indicating rich and the exhaust gas oxygen sensor that is positioned upstream of the three-way catalyst continues indicating rich. The exhaust gas oxygen sensor that is located downstream of the SCR catalyst switches from indicating lean conditions to indicating rich conditions as $NH_3$ is released from the SCR catalyst. The exhaust gas oxygen sensor that is located upstream of the SCR catalyst indicates lean conditions. The downstream exhaust gas oxygen sensor switching from lean to rich before the upstream exhaust gas oxygen sensor may be referred to as a HEGO inversion and the HEGO inversion may be indicative of $NH_3$ being released from the SCR catalyst. The downstream NOx sensor continues to indicate release of $NH_3$ from the SCR catalyst and $NH_3$ flowing into the SCR catalyst is low. The SCR temperature is reduced as compared to the SCR temperature at time t1.

At time t3, the exhaust Lambda continues indicating rich and the exhaust gas oxygen sensor that is positioned upstream of the three-way catalyst continues indicating rich. The exhaust gas oxygen sensor that is located downstream of the SCR catalyst continues indicating rich conditions. Output of the exhaust gas oxygen sensor that is located upstream of the SCR catalyst is switched from indicating lean conditions to indicating rich conditions. The downstream NOx sensor indicates that the release of $NH_3$ from the SCR catalyst is reduced and that $NH_3$ flowing into the SCR catalyst is low. The SCR temperature continues at a level that is near the level it was at time t2.

In this way, $NH_3$ may be stored to a SCR catalyst and released when desired so that it may be determined if a SCR catalyst may store $NH_3$ as expected. The storage capacity of the SCR catalyst may be confirmed by a downstream oxygen sensor switching to indicate rich before an upstream oxygen sensor indicates rich.

Referring now to FIG. 5, a method for controlling a temperature at an inlet of a SCR catalyst is shown. Method 500 may improve SCR catalyst efficiency and reduce a possibility of SCR degradation. Method 500 may be included in and may cooperate with the system of FIGS. 1-3. At least portions of method 500 may be incorporated in the system of FIGS. 1-3 as executable instructions stored in non-transitory memory. In addition, other portions of method 500 may be performed via a controller transforming operating states of devices and actuators in the physical world. The controller may employ actuators and sensors described herein to adjust a temperature at an inlet of a SCR catalyst. Further, method 500 may determine selected control parameters from sensor inputs.

At 502, method 500 judges if a SCR catalyst inlet temperature or a temperature at an inlet of the SCR catalyst is greater than a first threshold temperature (e.g., 450° Celsius). Method 500 may sense a temperature at the inlet of the SCR catalyst to judge if the SCR catalyst inlet temperature is greater than the first threshold temperature. If method 500 judges that the SCR catalyst inlet temperature is greater than the first threshold temperature, the answer is yes and method 500 proceeds to 504. Otherwise, the answer is no and method 500 proceeds to 520.

At 520, method 500 fully opens the diverter valve so that the diverter valve allows exhaust to flow though the first exhaust passage and not through the second exhaust passage. In this way, fully opening the diverter valve allows uncooled exhaust gas to flow directly from the three-way catalyst to the SCR catalyst without the exhaust gases flowing through the second exhaust passage where the exhaust may be cooled. Method 500 proceeds to exit.

At 504, method 500 at least partially closes the diverter valve to divert exhaust gas from the first exhaust passage to the second exhaust passage. In one example, the position of the diverter valve may be adjusted as a function of a temperature difference between a requested SCR catalyst inlet temperature and an actual SCR catalyst inlet temperature. By partially closing the diverter valve, a butterfly valve partially closes to reduce exhaust flow through the first exhaust passage. Partially closing the diverter valve also partially opens a butterfly valve to increase exhaust flow through the second exhaust passage that cools the exhaust. Exhaust that flows through the first passage and exhaust that flows through the second passage may be mixed just before the exhaust enters the SCR catalyst, thereby lowering the temperature at the inlet of the SCR catalyst.

Alternatively, if the exhaust system includes a venturi instead of a diverter valve, method 500 may open a valve so that the venturi may draw exhaust from the second passage to mix with exhaust that passed through the first passage. The mixed exhaust gas temperature may lower the temperature at the SCR catalyst inlet. Method 500 proceeds to 506.

At 506, method 500 judges if a SCR catalyst inlet temperature or a temperature at an inlet of the SCR catalyst is greater than the first threshold temperature (e.g., 450° Celsius). If method 500 judges that the SCR catalyst inlet temperature is greater than the first threshold temperature, the answer is yes and method 500 returns to 504. Otherwise, the answer is no and method 500 proceeds to 508.

At 508, method 500 adjusts a position of the diverter valve to maintain the temperature at the SCR catalyst inlet to fall within a requested temperature range (e.g., 200-400° Celsius). The requested temperature may be adjusted as a function of engine speed and driver demand torque.

Alternatively, if the exhaust system includes a venturi instead of a diverter valve, method 500 may open or close a valve so that the venturi may draw varying amounts of exhaust from the second passage to mix with exhaust that passed through the first passage. The mixed exhaust gas temperature may lower the temperature at the SCR catalyst inlet. Method 500 proceeds to 510.

At 510, method 500 judges if a SCR catalyst inlet temperature or a temperature at an inlet of the SCR catalyst is greater than the second threshold temperature (e.g., 150° Celsius). If method 500 judges that the SCR catalyst inlet temperature is greater than the second threshold temperature, the answer is yes and method 500 returns to 508. Otherwise, the answer is no and method 500 returns to 402. Thus, method 500 may return to 502 during conditions where the SCR catalyst inlet temperature may not be met via flowing exhaust through the second passage so that a higher temperature may be achieved at the inlet of the SCR catalyst.

In this way, method 500 may control a temperature at an inlet of a SCR catalyst. Method 500 may control a temperature at an inlet of a SCR catalyst via a diverter valve or via a valve that may regulate flow through a venturi.

Referring now to FIG. 6, a method for diagnosing a SCR catalyst is shown. Method 600 may provide an indication as to whether or not a SCR catalyst is operating as may be expected. In particular, method 600 may provide an indication whether or not a SCR catalyst may store $NH_3$ for use in converting NOx to $H_2O$ and $N_2$. Method 600 may be included in and may cooperate with the system of FIGS. 1-3. At least portions of method 600 may be incorporated in the system of FIGS. 1-3 as executable instructions stored in non-transitory memory. In addition, other portions of method 600 may be performed via a controller transforming operating states of devices and actuators in the physical world. The controller may employ actuators and sensors described herein to diagnose operation of a SCR catalyst. Further, method 600 may determine selected control parameters from sensor inputs.

At 602, method 600 judges if greater than a threshold amount of $NH_3$ is stored in a SCR catalyst. In one example, a model may provide an estimate of the amount of $NH_3$ that is stored in the SCR catalyst. If method 600 judges that greater than a threshold amount of $NH_3$ that is stored in the SCR catalyst, the answer is yes and method 600 proceeds to 604. Otherwise, the answer is no and method 600 proceeds to 620.

At 620, method 600 at least partially closes the diverter valve so that at least a portion of exhaust gases are cooled and so that the cooled exhaust gases are mixed with the exhaust gases that are not cooled to reduce a temperature at the inlet of the SCR catalyst. Reducing the temperature at the SCR catalyst inlet may allow the SCR to store larger amounts of $NH_3$. Alternatively, if the exhaust system includes a venturi, a valve that controls flow of cooled exhaust into the venturi may be at least partially opened to mix exhaust gases that enter the SCR catalyst, thereby increasing the storage capacity for $NH_3$ in the SCR catalyst. Method 600 proceeds to exit.

At 604, method 600 judges if conditions are present to increase the SCR catalyst temperature. In one example, conditions to increase the SCR catalyst temperature may be present when a threshold amount of $NH_3$ is stored in the SCR catalyst. In addition, conditions for increasing the SCR catalyst temperature may include the engine operating at a load that is above a threshold load (e.g., 0.5) and engine speed that is above a threshold speed (e.g., 2000 RPM). If method 600 judges that conditions are present to increase the SCR catalyst temperature, the answer is yes and method 600 proceeds to 606. Otherwise, the answer is no and method 600 returns to 604. Method 600 may also exit if the vehicle is deactivated or if the vehicle is operating under other select conditions.

At 606, method 600 at least partially opens the diverter valve to allow additional exhaust gases that have not passed through the second exhaust passage to enter the SCR catalyst. The additional exhaust gases may increase the temperature of the SCR catalyst so that $NH_3$ stored in the SCR catalyst may be released. Alternatively, if the exhaust system includes a venturi, a valve that controls cooled exhaust flow into the SCR catalyst may be closed. Method 600 proceeds to 608.

At 608, method 600 judges if a temperature at the inlet of the SCR catalyst is greater than a threshold temperature. If so, the answer is yes and method 600 proceeds to 610. Otherwise, the answer is no and method 600 returns to 602 so that the diverter valve may be opened further.

At 610, method 600 adjusts a position of the diverter valve to maintain a requested temperature at the SCR catalyst inlet (e.g., 300° Celsius). The requested temperature may be adjusted as a function of engine speed and driver demand torque.

Alternatively, if the exhaust system includes a venturi instead of a diverter valve, method 600 may open or close a valve so that the venturi may draw varying amounts of exhaust from the second passage to mix with exhaust that passed through the first passage. The mixed exhaust gas temperature may lower the temperature at the SCR catalyst inlet. Method 600 proceeds to 612.

At 612, method 600 operates the engine with a leaner air-fuel ratio. In one example, method 600 may operate the engine in a fuel cut-off mode where fuel is not supplied to the engine and the engine rotates and delivers fresh air to the SCR catalyst. Alternatively, method 600 may lean the engine's air-fuel ratio. Method 600 proceeds to 614.

At 614, method 600 monitors a state of an oxygen sensor that is upstream of the SCR catalyst and a state of an oxygen sensor that is downstream of the SCR catalyst. The oxygen sensors may be monitored for a predetermined amount of time after the engine's air-fuel ratio is leaned. If the downstream oxygen sensor indicates rich conditions due to release of $NH_3$ before the upstream oxygen sensor switches from lean to rich, method 600 judges that a HEGO inversion is present and method 600 proceeds to 618. Otherwise, the answer is no and method 600 proceeds to 616.

At 618, method 600 indicates that the SCR catalyst is not degraded since the SCR catalyst has stored NH$_3$. Method 600 proceeds to exit.

At 616, method 600 indicates that the SCR catalyst is degraded since the SCR catalyst does not appear to have stored NH$_3$. Method 600 proceeds to exit. Method 600 may also take mitigating actions. For example, the engine may be restricted to operate at conditions where engine NOx production may be lower (e.g., lower loads, less spark advance, etc.) so that tailpipe NOx emissions may be lower. Method 600 proceeds to exit.

In this way, method 600 may diagnose operation of a SCR catalyst to determine if the SCR catalyst may store NH$_3$. If the SCR catalyst lacks NH$_3$ storage capacity, an indication that the SCR catalyst is degraded (e.g., not performing as may be expected) may be provided via a human/machine interface so that the vehicle may be serviced.

The methods of FIGS. 5 and 6 provide for a method for operating a selective catalytic reduction (SCR) catalyst, comprising: controlling a temperature at an inlet of the SCR via mixing exhaust gas flowing through a first exhaust passage and exhaust gas flowing through a second exhaust passage, the second exhaust passage including cooling fins, the first exhaust passage not including cooling fins. The method further comprises adjusting the temperature at the inlet via adjusting a position of a diverter valve, the diverter valve including a shaft that couples a first valve plate and a second valve plate. The method further comprises cooling exhaust gases that flow through the second exhaust passage to a greater extent than exhaust gases that flow through the first exhaust passage. The method further comprises adjusting an engine air-fuel ratio to cause a downstream oxygen sensor to switch from indicating lean to indicating rich prior to an upstream oxygen sensor switching from indicating lean to indicating rich. The method includes where the engine air-fuel ratio is adjusted in response to a request to perform a SCR catalyst diagnostic. The method includes where the temperature at the inlet of the SCR is adjusted to increase an amount of NH$_3$ stored in the SCR catalyst. The method further comprises adjusting the temperature at the inlet via adjusting air flow through a venturi.

The methods of FIGS. 5 and 6 provide for a method for operating a selective catalytic reduction (SCR) catalyst, comprising: controlling a temperature at an inlet of the SCR via mixing exhaust gas flowing through a first exhaust passage and exhaust gas flowing through a second exhaust passage; and leaning an air-fuel mixture supplied to an engine in response to a request for a diagnostic for the SCR after storing NH$_3$ in the SCR via controlling the temperature at the inlet of the SCR. The method further comprises indicating degradation of the SCR in response to a change of state of a first oxygen sensor and a change of state of a second oxygen sensor. The method includes where the first oxygen sensor is positioned upstream of the SCR and where the second oxygen sensor is positioned downstream of the SCR. The method includes where the change in state is from an indication of lean exhaust gases to rich exhaust gases. The method includes where the temperature is controlled via a diverter valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a selective catalytic reduction (SCR) catalyst, comprising:
    controlling a temperature at an inlet of the SCR catalyst via mixing exhaust gas flowing through a first exhaust passage and exhaust gas flowing through a second exhaust passage, the second exhaust passage including cooling fins, the first exhaust passage not including cooling fins; and
    adjusting the temperature at the inlet via adjusting a position of a diverter valve, the diverter valve including a shaft that couples a first valve plate and a second valve plate.

2. The method of claim 1, further comprising cooling exhaust gases that flows through the second exhaust passage to a greater extent than exhaust gases that flow through the first exhaust passage, the second exhaust passage including a component to increase thermal inertia within the second exhaust passage.

3. The method of claim 1, further comprising adjusting an engine air-fuel ratio to cause a downstream oxygen sensor to switch from indicating lean to indicating rich prior to an upstream oxygen sensor switching from indicating lean to indicating rich.

4. The method of claim 3, where the engine air-fuel ratio is adjusted in response to a request to perform a SCR catalyst diagnostic.

5. The method of claim 4, where the temperature at the inlet of the SCR catalyst is adjusted to increase an amount of $NH_3$ stored in the SCR catalyst.

6. The method of claim 1, further comprising adjusting the temperature at the inlet via adjusting air flow through a venturi.

7. A system for controlling engine emissions, comprising:
   an internal combustion engine including an exhaust system;
   a selective catalytic reduction catalyst included in the exhaust system; and
   a controller including executable instructions stored in non-transitory memory that cause exhaust gases from the internal combustion engine to flow into at least one of two passages in the exhaust system, the two passages arranged in parallel, one of the two passages including cooling fins and an uncoated catalyst substrate, the other of the two passages not including cooling fins.

8. The system of claim 7, further comprising a venturi, the venturi configured to mix exhaust gases from the one of the two passages and the other of the two passages.

9. The system of claim 8, further comprising additional instructions to adjust exhaust gas flow through the one of the two passages via a valve.

10. The system of claim 7, further comprising a diverter valve, the diverter valve including two butterfly valves.

11. The system of claim 10, where the two butterfly valves are coupled via a shaft.

12. The system of claim 7, further comprising additional instructions to adjust a position of a valve in response to a temperature at an inlet of the selective catalytic reduction catalyst.

13. The system of claim 12, where the valve closes the other of the two passages and opens the one of the two passages in response to a temperature at an inlet of the selective catalytic reduction catalyst exceeding a threshold temperature.

14. The system of claim 13, where the valve opens the other of the two passages and closes the one of the two passages in response to the temperature at the inlet of the selective catalytic reduction catalyst being less than a second threshold temperature.

15. A method for operating a selective catalytic reduction (SCR) catalyst, comprising:
   controlling a temperature at an inlet of the SCR catalyst via mixing exhaust gas flowing through a first exhaust passage and exhaust gas flowing through a second exhaust passage; and
   leaning an air-fuel mixture supplied to an engine in response to a request for a diagnostic for the SCR catalyst after storing $NH_3$ in the SCR catalyst via controlling the temperature at the inlet of the SCR catalyst.

16. The method of claim 15, further comprising indicating degradation of the SCR catalyst in response to a change of state of a first oxygen sensor and a change of state of a second oxygen sensor.

17. The method of claim 16, where the first oxygen sensor is positioned upstream of the SCR catalyst and where the second oxygen sensor is positioned downstream of the SCR catalyst.

18. The method of claim 17, where the change in state is from an indication of lean exhaust gases to rich exhaust gases.

19. The method of claim 15, where the temperature is controlled via a diverter valve.

* * * * *